No. 737,998. PATENTED SEPT. 1, 1903.
T. H. BUTLER.
HOISTING MECHANISM.
APPLICATION FILED JAN. 24, 1903.
NO MODEL.
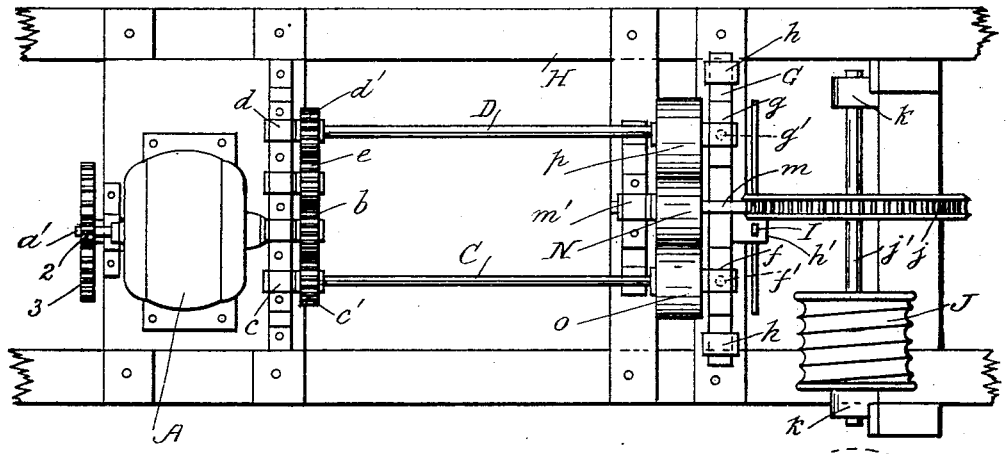

No. 737,998.                                                  Patented September 1, 1903.

UNITED STATES PATENT OFFICE.

THOMAS H. BUTLER, OF BALTIMORE, MARYLAND.

HOISTING MECHANISM.

SPECIFICATION forming part of Letters Patent No. 737,998, dated September 1, 1903.

Application filed January 24, 1903. Serial No. 140,399. (No model.)

*To all whom it may concern:*

Be it known that I, THOMAS H. BUTLER, a citizen of the United States, residing at Baltimore city, State of Maryland, have invented certain new and useful Improvements in Hoisting Mechanism; and I do hereby declare the following to be a full, clear, and exact description of the invention, such as will enable others skilled in the art to which it appertains to make and use the same.

This invention relates to hoisting mechanism; and it consists in the novel construction and combination of the parts hereinafter fully described and claimed.

In the drawings, Figure 1 is a plan view of the hoisting mechanism. Fig. 2 is a side view, and Fig. 3 is an end view, of the hoisting mechanism.

A is a motor of any approved construction, such as an electric motor, and $a'$ is the motor-shaft.

B is the main driving-shaft, which is journaled in suitable bearings and driven from the motor-shaft by toothed wheels 2 and 3. A toothed driving-wheel $b$ is secured on the shaft B.

C and D are two secondary driving-shafts, which are revolved in opposite directions by the said main driving-shaft whenever the motor is in action. At the end nearest the motor these shafts are journaled in bearings $c$ and $d$ and have secured on them toothed wheels $c'$ and $d'$. The wheel $c'$ gears direct with the wheel $b$. The wheel $d'$ is arranged on the other side of the wheel $b$ from the wheel $c'$, and $e$ is a toothed idle wheel which gears into the wheels $d'$ and $b$. In this manner the two shafts are constrained to revolve in opposite directions. At the end farthest from the motor the shafts C and D are journaled in bearings $f$ and $g$, which are pivoted by pins $f'$ and $g'$ to a bar G, which is slidable longitudinally in guides $h$.

The guides $h$, the motor, and other working parts of the machine are all mounted in a suitable framework H.

I is a double bell-crank lever pivoted by a pin $i$ to the frame H. The short arm of this lever engages with a socket $h'$ on the bar G, and the lever affords a means for sliding the bar back and forth. Cords $i'$ are attached to the ends of the double bell-crank lever for operating it when the machine is arranged in the upper part of a room or building.

J is the hoisting-barrel or other equivalent device on which the hoisting rope or chain is wound. This barrel has a worm-wheel $j$ secured to it, and its shaft $j'$ is mounted in bearings $k$, secured to the frame H.

M is a worm secured on a winding-shaft $m$ and arranged in gear with the worm-wheel $j$. The shaft $m$ is journaled in stationary bearings $m'$, secured to the frame H.

N is a friction-wheel secured on the winding-shaft $m$, and $o$ and $p$ are two friction-wheels secured on the shafts C and D, respectively, adjacent to the bearings $f$ and $g$. The friction-wheel N is arranged between the wheels $o$ and $p$, and when it is not in driving contact with either of these wheels the barrel is not revolved. The barrel is revolved to raise or to lower the load by sliding the bar G, so as to bring the wheels $o$ or $p$ into driving contact with the wheel N, the direction of motion being determined by the wheel $o$ or $p$, which for the time being is driving the wheel N and the winding-shaft.

What I claim is—

1. The combination, with a main driving-shaft, of two secondary driving-shafts, driving mechanism connecting the said shafts with the main shaft so that they revolve in opposite directions, two friction-wheels secured on the said secondary shafts, a winding-shaft, a friction-wheel secured on the said winding-shaft between the aforesaid friction-wheels, and means for sliding the two said friction-wheels alternately into engagement with the said friction-wheel between them, substantially as set forth.

2. The combination, with a main driving-shaft, and a toothed wheel $b$ secured on it; of two secondary driving-shafts arranged on opposite sides of the said main shaft, a toothed wheel secured on one of the said secondary shafts and gearing direct with the wheel $b$, a toothed wheel $d'$ secured on the other said secondary shaft, an idle toothed wheel gearing into the said wheels $b$ and $d'$, two friction-wheels secured on the said secondary shafts, a winding-shaft, a friction-wheel secured on the said winding-shaft between the aforesaid friction-wheels, and means for sliding the two said friction-wheels alternately into engagement with the said friction-wheel between them, substantially as set forth.

3. The combination, with a main driving-shaft, of two secondary driving-shafts, driving mechanism arranged at one end of the said shafts and connecting them with the said main shaft so that they revolve in opposite directions, a bar slidable transversely of the said shafts, bearings pivoted to the said bar and supporting the other ends of the said shafts, two friction-wheels secured on the said shafts adjacent to their said pivoted bearings, a winding-shaft, a friction-wheel secured on the said winding-shaft between the aforesaid friction-wheels, and means for sliding the said bar, substantially as set forth.

4. The combination, with a barrel, and a worm-wheel secured to it; of a winding-shaft, a friction-wheel secured on the said shaft, a worm also secured on the said shaft and gearing into the said worm-wheel, two friction driving-wheels arranged upon opposite sides of the said friction-wheel, driving mechanism which revolves the said friction driving-wheels in opposite directions, and means for sliding the said friction driving-wheels alternately into driving contact with the said friction-wheel between them, substantially as set forth.

In testimony whereof I affix my signature in presence of two witnesses.

THOMAS H. BUTLER.

Witnesses:
J. MILTON LYELL,
T. BAYARD WILLIAMS.